United States Patent
Furetta

(10) Patent No.: US 7,605,777 B2
(45) Date of Patent: Oct. 20, 2009

(54) DISPLAY DEVICE FOR A PORTABLE INSTRUMENT SUCH AS A WATCH

(75) Inventor: Alessandra Furetta, Grenchen (CH)

(73) Assignee: Montres Rado S.A., Lengnau (CH)

( * ) Notice: Subject to any disclaimer, the term of this patent is extended or adjusted under 35 U.S.C. 154(b) by 328 days.

(21) Appl. No.: 11/750,760

(22) Filed: May 18, 2007

(65) Prior Publication Data

US 2007/0280839 A1 Dec. 6, 2007

(30) Foreign Application Priority Data

Jun. 2, 2006 (EP) .................................. 06114946

(51) Int. Cl.
*G09G 3/04* (2006.01)
(52) U.S. Cl. ............... 345/34; 40/406; 368/65
(58) Field of Classification Search .............. 345/33, 345/34, 43, 105–107, 204; 40/406, 407, 40/412, 422, 439, 477; 368/65, 294, 76
See application file for complete search history.

(56) References Cited

U.S. PATENT DOCUMENTS

| | | | |
|---|---|---|---|
| 1,330,179 A | | 2/1920 | Edtbauer |
| 4,034,554 A | | 7/1977 | Hadany |
| 4,144,663 A | | 3/1979 | Saenger et al. |
| 5,771,810 A | * | 6/1998 | Wolcott .................. 101/483 |
| 6,037,955 A | | 3/2000 | DeBoer et al. |
| 7,205,962 B2 | * | 4/2007 | Cooke ..................... 345/60 |
| 7,304,620 B2 | * | 12/2007 | Yamamoto et al. ............. 345/5 |
| 2004/0257496 A1 | | 12/2004 | Sonoda et al. |

FOREIGN PATENT DOCUMENTS

| | | |
|---|---|---|
| CH | 679 555 A5 | 3/1992 |
| WO | 87/07218 | 12/1987 |
| WO | 02/067232 | 8/2002 |
| WO | 2004/068208 A1 | 8/2004 |

OTHER PUBLICATIONS

Australian Search Report issued in corresponding Singapore application No. SG 200703783-1, completed Dec. 7, 2007 and mailed Dec. 20, 2007.
Lea, Michael, "Electrocapillarity modulators and large screen projection displays," SPIE vol. 684 Liquid Crystals and Spatial Light Modulator Materials, pp. 45-59, 1986.
European Search Report issued in corresponding application No. EP 06 11 4946, completed Jan. 25, 2007.

* cited by examiner

*Primary Examiner*—Jimmy H Nguyen
(74) *Attorney, Agent, or Firm*—Griffin & Szipl, P.C.

(57) ABSTRACT

A display device for a portable instrument includes at least a first transparent or semi-transparent plate arranged on a bottom element. Several closed cavities are formed at least in part in the first plate in the field of view of the device to display information. Each cavity is connected by a respective channel through the bottom element to a tank of colored fluid via feed means for filling or emptying each closed cavity of colored fluid for displaying information. The feed means include at least one micropump connected by an inlet pipe to the colored fluid tank, and microvalves connected to the micropump by a common outlet pipe. Each cavity is directly connected via its respective channel to a corresponding microvalve. The micropump and the microvalves are controlled by electric signals from control means, which can be clocked by a time base in order to control display of time information.

15 Claims, 4 Drawing Sheets

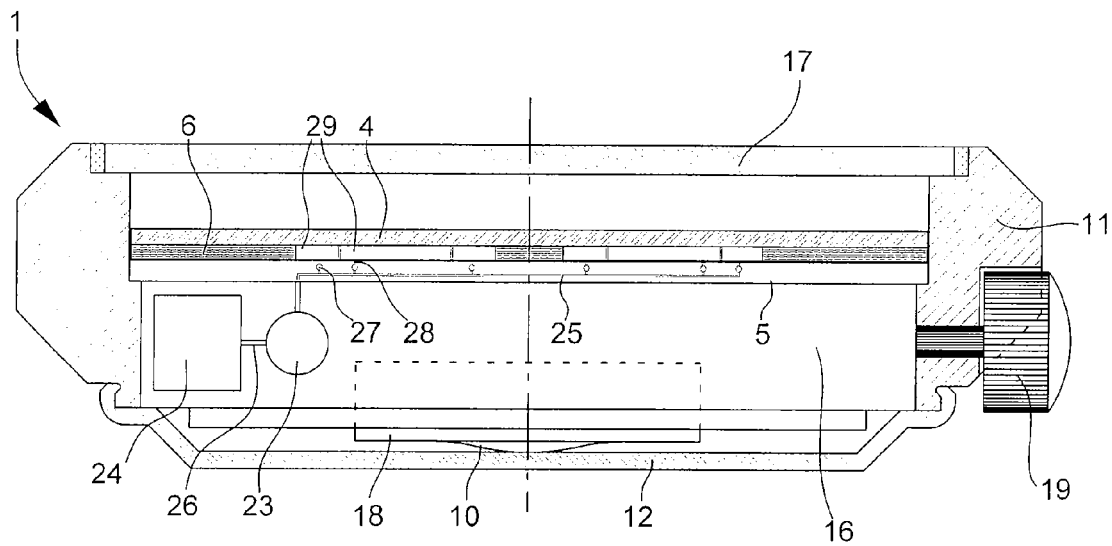
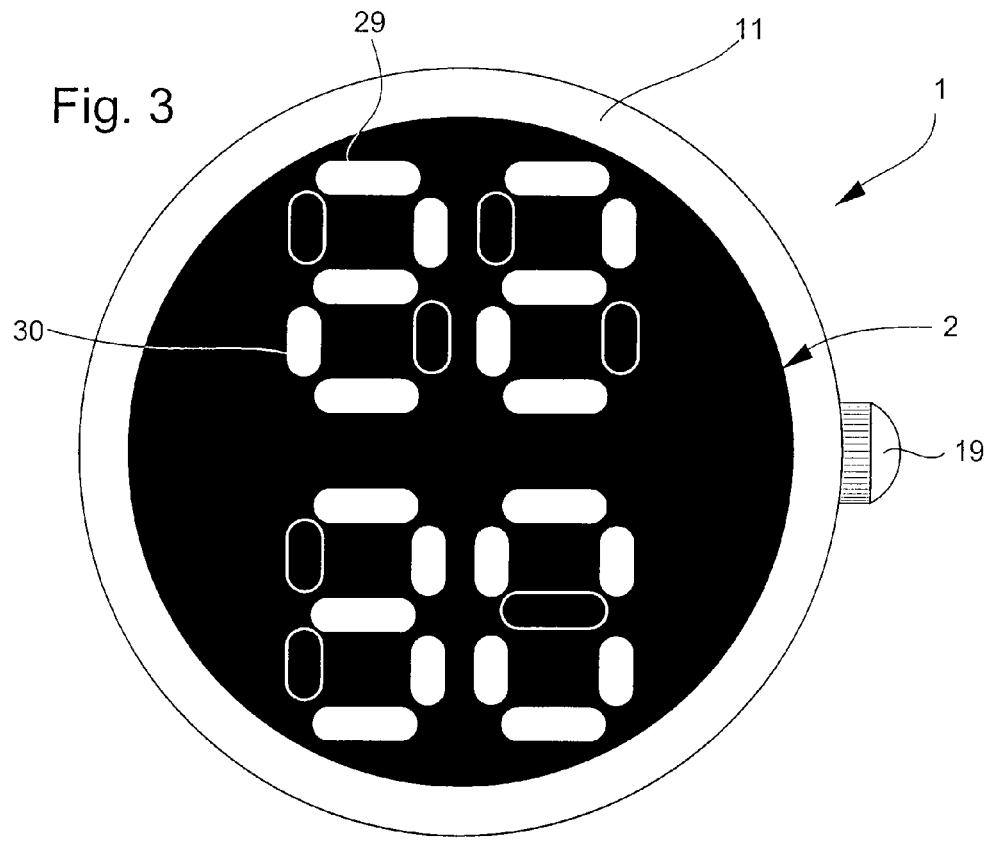

DISPLAY DEVICE FOR A PORTABLE INSTRUMENT SUCH AS A WATCH

This application claims priority from European Patent Application No. 06114946.4 filed 2 Jun. 2006, the entire disclosure of which is incorporated herein by reference.

FIELD OF THE INVENTION

The present invention concerns a display device for a portable instrument, such as a watch. The display device includes at least one first transparent or semi-transparent plate arranged on a bottom element, a closed cavity being formed at least in part in the first plate in the field of view of the device for displaying data through the plate.

The present invention also concerns a watch that includes such a display device.

BACKGROUND OF THE INVENTION

Usually, a device for displaying data in a portable instrument is formed by a liquid crystal cell. The display cell comprises a transparent front substrate having first transparent electrodes on an inner face, a transparent back substrate having at least one second transparent electrode on an inner face and a frame sealing the two substrates to define a closed space between the substrates. A substance occupies the closed space between the first and second electrodes. The optical or physical properties of the substance can be altered between the activated electrodes by a difference in the potential applied by control means. Via the action of the control means, the display cell, which also has polarizers, can display data, for example the time or date.

The electrodes of such liquid crystal cells must be continuously electrically powered so as to maintain or alter the display of data, which may constitute a drawback if the portable instrument is powered by a battery or accumulator of small size. Moreover, the liquid crystal cell does not allow the data display to be maintained when the battery is being changed.

SUMMARY OF THE INVENTION

It is a main object of the present invention to provide a display device for a portable instrument, such as a watch, of a new type in order to overcome the aforecited drawbacks of the devices of the prior art.

The present invention therefore concerns the aforementioned display device which includes at least a first transparent or semi-transparent plate arranged on a bottom element, several cavities being formed at least in part in the first plate in the field of view of the device to display information through the plate, each cavity being connected by a respective channel through the bottom element to a tank of coloured fluid via feed means for filling or emptying each closed cavity of coloured fluid for the display of information, the feed means including at least one micropump connected to the coloured fluid tank, wherein the coloured fluid feed means include, for feeding each cavity with coloured fluid, a microvalve directly connected to the respective channel of the closed cavity to be filled with or emptied of coloured fluid, each microvalve being connected by a common outlet pipe to a micropump, which is directly connected by an inlet pipe to the tank of coloured fluid.

Particular advantageous embodiments of the display device are defined in other embodiments of the invention. For example, in accordance with another embodiment of the invention, the display device may be further modified so that the respective channels of the closed cavities pass through the bottom element, which is opaque, to be connected to the coloured fluid tank via the coloured fluid feed means. In accordance with yet another embodiment of the present invention, the display device may be further modified so that the micropump and the microvalves are controlled by electric signals supplied by control means, the microvalves being closed in a rest position without any control signals being supplied by the control means to keep the coloured fluid in the selected cavities as a function of the information to be presented. In accordance with still another embodiment of the present invention, the display device may be even further modified for a watch as a portable instrument, wherein the watch includes an electronic watch movement with a timekeeper circuit, wherein the microvalves arranged in the bottom element and the micropump are activated by electric signals supplied by the control means, which are clocked by a time base of the time-keeper circuit so as to select certain closed cavities to be filled with or emptied of coloured fluid in order to display a time or date, said closed cavities being configured in digits each formed of display segments.

In accordance with another embodiment of the present invention, the display device may be modified so that the first plate is formed of a top plate fixed to an intermediate plate, which is arranged on the bottom element, each closed cavity being formed at least in part in the intermediate plate. In accordance with yet another embodiment of the present invention, the display device may be further modified so that each cavity formed in the intermediate plate from a bottom surface of the top plate is closed by the top surface of the bottom element. In accordance with still another embodiment of the present invention, the display device may be further modified so that it includes a set of transparent or semi-transparent stones, which are held in the material of the intermediate plate to combine the information displayed with the refraction of light through the visible stones and/or the reflection onto or in said stones, and wherein each closed cavity is formed in the intermediate plate between a top facet of each stone and a bottom surface of the top plate, the coloured fluid feed channel of each cavity passing through the intermediate plate and passing through the bottom element to be connected via the feed means to the coloured fluid tank. In accordance with yet another embodiment of the present invention, the display device may be even further modified so that the stones are precious stones which are arranged in the material of the intermediate plate in the form of digits opposite the cavities configured in digits, and wherein the shape and dimension of each segment formed by each closed cavity are selected so that the entirety or a part of at least two stones per cavity not filled with coloured fluid is perceived.

In accordance with another embodiment of the present invention, the display device may be modified so that the first plate is formed of a transparent or semi-transparent support secured to an intermediate plate, which is arranged on the bottom element, each closed cavity being formed at least in part in the intermediate plate, and wherein the support forms a grid holding several precious transparent or semi-transparent stones close to each other to cover the portion of the support that is directly visible in the field of view of the display device.

One advantage of the display device according to the invention lies in the fact that a closed cavity is formed in part in a transparent or semi-transparent plate arranged on a bottom element in order to be filled with or emptied of a coloured fluid via coloured fluid feed means, for displaying data. For the negative contrast type data display, the coloured fluid is removed from the cavity if the colour of the display device around the cavity is identical to the colour of the coloured fluid. In the opposite case of a positive contrast type data display, the closed cavity is filled with the coloured fluid.

Preferably, several closed cavities are formed at least in part in the first transparent or semi-transparent plate. One channel per cavity is connected through the bottom element via coloured fluid feed means to a coloured fluid tank. These feed means comprise for example at least one micropump connected via an inlet pipe directly to the coloured fluid tank, and via a common outlet pipe to one microvalve per cavity directly connected to the respective channel of the corresponding cavity.

Advantageously, the micropump and the microvalves are controlled by electric signals from control means to fill or empty certain cavities of coloured fluid. In the case of a watch, the control means are clocked by a time base of an electronic watch movement to control the display of a time or date. In order to do this, the cavities are configured in digits each formed of 7 display segments.

Advantageously, the first plate is formed of a transparent glass or plastic top plate fixed to an intermediate glass or plastic plate, which may be partly tinted. The closed cavities are formed in part in the intermediate plate. Several transparent or semi-transparent stones, such as precious or synthetic stones, can be integrated in the material of the intermediate plate. These stones are also arranged in digits directly opposite the digits formed by the cavities. In the absence of any coloured fluid in the cavities, the stones combine the data from the device with the refraction of light through the stones and/or reflection of light on or in the stones to improve the quality of the display.

The precious stones may be rubies, sapphires or emeralds, moonstones, diamonds, or other precious stones. These stones may also be synthetic stones, such as monocrystalline cubic zirconia. Consequently, several sorts of stones of equal or different size can be fitted to the support in order to give different colours through the data of the device and a particular diffraction or reflection of the light.

Advantageously, a backlighting device can be provided for lighting some transparent or semi-transparent stones visible via the transparency of some cavities that are not filled with coloured fluid in the field of view of the display device. The cut of the stones can be optimised in order to allow a maximum amount of light pass. The cut may be of the brilliant or baguette type or another type with several facets.

If a support of transparent or semi-transparent stones is fixed to the intermediate plate for a display preferably having a positive contrast, certain selected cavities are filled with a coloured fluid, for example, black. The parts around the displayed data may appear in a light colour, for example white or silver so as to contrast well with the data read through the support stones in daylight or using a backlighting device.

The present invention therefore also concerns a watch that comprises a display device wherein the watch including in a case closed by a crystal a display device, wherein the display device comprises at least a first transparent or semi-transparent plate arranged on a bottom element, several cavities being formed at least in part in the first plate in the field of view of the device to display information through the plate, each cavity being connected by a respective channel through the bottom element to a tank of coloured fluid via feed means for filling or emptying each closed cavity of coloured fluid for the display of information, the feed means including at least one micropump connected to the coloured fluid tank, wherein the coloured fluid feed means include, for feeding each cavity with coloured fluid, a microvalve directly connected to the respective channel of the closed cavity to be filled with or emptied of coloured fluid, each microvalve being connected by a common outlet pipe to a micropump, which is directly connected by an inlet pipe to the tank of coloured fluid, wherein the coloured fluid feed means of the display device include at least one micropump connected to a tank of coloured fluid and several microvalves connected via a common outlet pipe to the micropump, each microvalve being connected to a respective cavity via a channel through the bottom element, and wherein the micropump and the microvalves are controlled by electric signals supplied by control means clocked by a time base of the watch movement so that certain selected cavities are filled with or emptied of the coloured fluid for displaying information, such as a time or a date.

Particular advantageous embodiments of the watch are defined in other embodiments of the present invention. For example, the watch may be modified so that one part of the display device forms the watch dial, and wherein time indicating hands, which are driven by a drive device of a watch movement, pass through the bottom element and the first transparent or semi-transparent plate to indicate the time. In accordance with another embodiment of the present invention, the watch may be modified so that the closed cavities are configured in digits each formed of display segments, and wherein the micropump and the microvalves are controlled by electric signals supplied by control means, the microvalves being closed in a rest position without any control signals being supplied by the control means to hold the coloured fluid in the selected cavities as a function of the information to be presented. In accordance with still another embodiment of the present invention, the watch may be modified so that the coloured fluid tank may be connected by an isolated passage through the watchcase so as to be filled with coloured fluid or to allow the type of coloured fluid to be changed.

BRIEF DESCRIPTION OF THE DRAWINGS

The objects, advantages and features of the display device and the watch will appear more clearly in the following description of non-limiting embodiments of the invention with reference to the drawings, in which:

FIGS. 2 and 3 show a diametral cross-section and a top view of a first embodiment of a display device according to the invention fitted to a watch with a digital time display;

DETAILED DESCRIPTION OF THE INVENTION

Figure 1A:
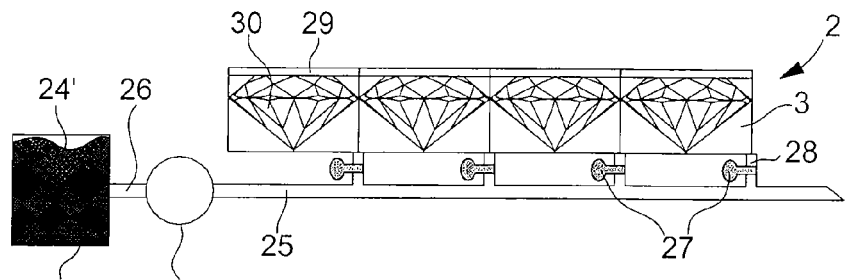
FIGS. 1a to 1f show schematically various display steps of the display device according to the invention using a coloured fluid, combined with a plate or a transparent or semi-transparent support with precious stones.

In the following description, reference is made only to a display device fitted to a watch, for example a wristwatch, as a portable instrument. All the conventional parts of the display device, which form part of the general knowledge of those skilled in the art, will only be briefly explained here in the following description. However, it is clear that this type of display device could be fitted to other portable instruments, such as a portable telephones, electronic organizers or other instruments.

FIGS. 1a to 1f illustrate several schematic views of various display steps of a part of a display device 2 according to the invention using a coloured fluid 24', which is black for example, for displaying data, for example time information. The coloured fluid is selected to offer sufficient contrast for the display of data relative to the shade or general colour of the display device in the field of view next to the top plate of the display device. Coloured fluid feed means is provided for conveying the coloured fluid into a data display position.

Generally, display device 2 is formed of at least one micropump 23 that is connected by an inlet pipe 26 to a tank 24 for colored fluid 24', a certain number of valves or microvalves 27 connected to micropump 23 by a common outlet pipe 25, and several cavities or cells 29 made at least partly in a first solid transparent or partially transparent plate. The micropump and the microvalves form part of the coloured fluid feed means. The closed cavities are each connected by a corresponding channel 28 to a respective microvalve 27. Display device 2 may also include an intermediate plate or a transparent or semi-transparent support in which transparent or semi-transparent stones are placed. These stones may be precious stones 30, such as cut diamonds, or synthetic stones, such as monocrystalline cubic zirconia.

In the simplified configuration shown in FIGS. 1a to 1f, structure 3 with precious stones 30 is arranged just below each cavity 29 able to receive coloured fluid 24'. Moreover, for the sake of simplification, each channel 28 is represented only by a line between each stone to connect, via structure 3, each microvalve to the corresponding cavity 29. It should also be noted that one or several stones could be placed in each cavity rather than on a particular support in order to be covered with the coloured fluid when the corresponding cavity is filled with said fluid.

Micropump 23 and microvalves 27 are controlled by control means that are not shown. Preferably, electric signals are provided by the control means in order to activate micropump 23, for example of the two-directional type, and control each microvalve 27. Preferably, each microvalve remains closed in the rest state, i.e. when not receiving any electric signals from the control means, in order to save energy.

In FIG. 1a, display device 2 is in a rest position in which none of the microvalves and the micropump is being activated by electric signals. Coloured fluid 24' thus remains in storage tank 24. Since each cavity 29 is not filled with the coloured fluid, precious stones 30 of structure 3 are therefore visible in the field of view of the display device so as to reflect or refract the daylight through said stones. In this state, if the colour of the display device around cavities 29 is substantially the same as the colour seen through the set of cavities that are not filled with the coloured fluid, no data is shown to the display device user's eyes.

Figure 1B:
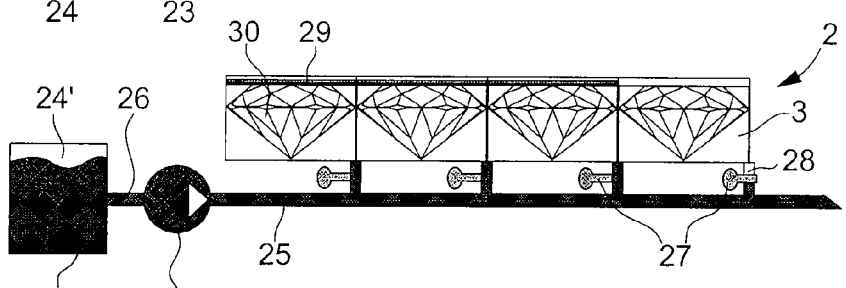
Figure 1C:
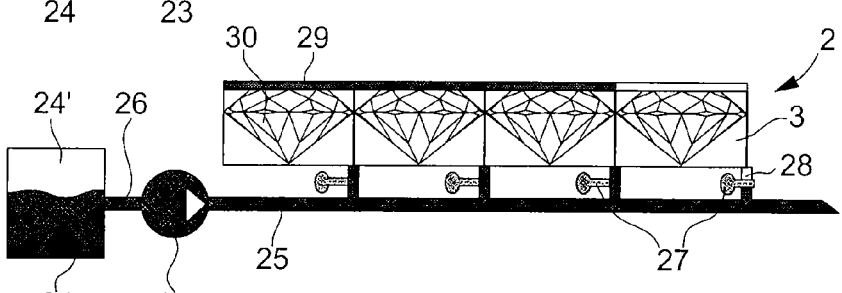
Figure 1D:
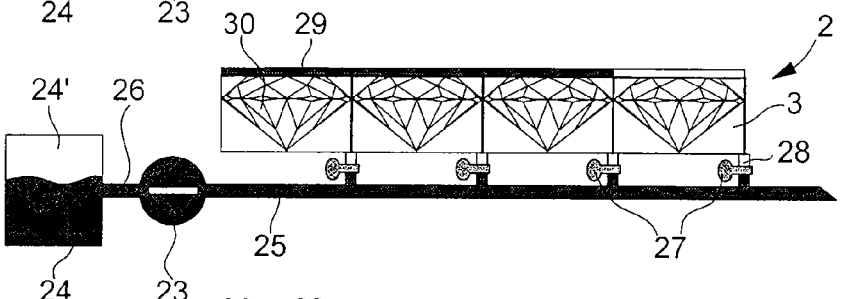
Figure 1E:
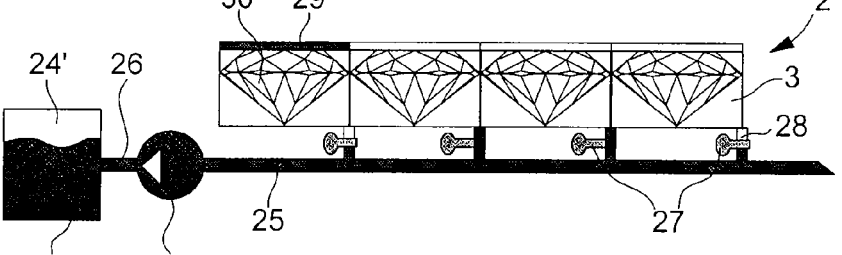

In FIGS. 1b and 1c, micropump 23 is activated to convey coloured fluid 24' from tank 24 via inlet pipe 26 through outlet pipe 25. As shown as a non-limiting example, the first three microvalves 27 seen from the left are controlled to be open, whereas the fourth microvalve remains closed. Coloured fluid 24' is thus pushed through each channel 28 connecting the open microvalves 27. The first three cavities or cells 29 are gradually filled with the coloured fluid 24' transmitted by activation of the micropump. In the state shown in FIG. 1c, the precious stones 30 below the cavities filled with coloured fluid 24' are no longer visible in the field of view of the display device. Data can be so displayed in the positive contrast display device because the coloured fluid has filled certain cavities. For a negative contrast device, the data is displayed by the cavities empty of coloured fluid.

Once the selected cavities 29 have been filled with the coloured fluid, micropump 23 and microvalves 27 are all no longer activated by the control means. This means that all the microvalves are closed while keeping the coloured fluid in selected cavities 29 according to the data that has to be presented.

When the information shown in display device 2 is changed, micropump 23 can be activated by the control means in the opposite direction, i.e. to suck the coloured fluid 24' out of certain cavities 29 in order to store it in tank 24. As shown by way of non-limiting example in FIG. 1e, only the second and third microvalves 27 are activated by the control means in order to open. Consequently, the coloured fluid 24' of the second and third cavities is sucked by micropump 23. Thus, only the first precious stone 30 is not visible in the field of view of the display device.

Figure 1F:
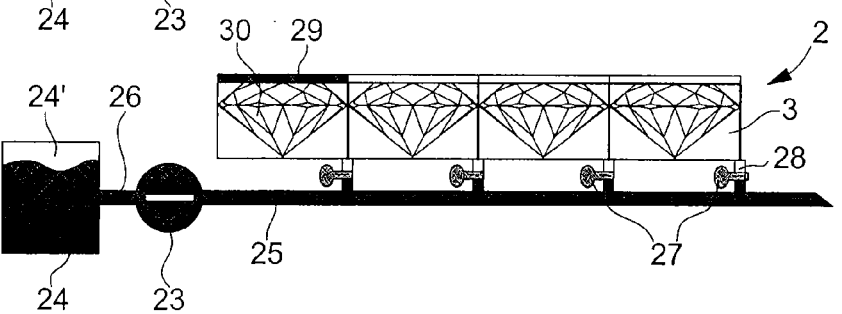

Finally in FIG. 1f, once coloured fluid 24' has been sucked from the selected cavities or cells 29, micropump 23 and all of microvalves 27 are no longer activated. Thus, as for FIG. 1d, the microvalves are closed. It is thus clear that unlike a liquid crystal display device, it is not necessary to continually supply electric power to the display device 2 in order to present determined data. Consequently, since display device 2 is fitted to a portable instrument, such as a wristwatch powered by a battery or accumulator of small size, a saving in electrical energy will be observed relative to the display devices of the prior art.

One could envisage using a first micropump for conveying the coloured fluid from the tank to the selected cavities and a second micropump for sucking the coloured fluid from certain cavities filled with said fluid. Means could also be provided for allowing air to exit or enter each cavity, when said cavity is filled with or emptied of the coloured fluid. Moreover, instead of the microvalves, each channel 28 could be connected to a specific micropump whose inlet pipe is directly and commonly connected to tank 24 of coloured fluid 24'.

A micropump 23 could be made in accordance with an equivalent principle to that of the micropump disclosed in CH Patent No. 679 555, which explains the operation of this type of micropump. Generally, this type of micropump is formed of a pumping chamber, an inlet channel and an outlet channel. The inlet channel communicates with the pumping chamber via a first suction valve, whereas the outlet channel communicates with the pumping chamber via a second outlet valve. All of these elements are conventionally made by etching a silicon wafer, which is subsequently enclosed between two glass plates. The inlet and outlet channels of the micropump are made through at least one of the glass plates. Because of the etching of the silicon wafer, a sufficiently thin part of the wafer forms a membrane capable of moving as a function of a difference of pressure particularly in the pumping chamber. To activate the micropump, a piezoelectric disc is preferably used, positioned on a deformable wall of one of the glass plates opposite the pumping chamber.

Other types of micropump can be used to fulfil the same function for the display device according to the invention. In order to do so, the reader can refer to other types of micropump, as described in the websites www.ahd.tudelft.nl/-peterv/presentations/micropumps.pdf or www.pro-4-pro.com/en/Micro/Company-4400149/42b6c62ca6815.html.

The set of microvalves 27 of display device 2 can also be achieved by etching a silicon wafer secured to a glass plate in accordance with an equivalent principle to that described in EP Patent Application No. 0 310 605. Each microvalve closing valve is arranged to close the passage by direct contact on the glass plate between one inlet channel and one outlet channel 28 of the microvalve in the rest position. One piezoelectric microvalve layer can be placed either on the silicon wafer or on a deformable portion of the glass plate opposite the closing valve. When the piezoelectric layer of the corresponding microvalve is activated by electric signals, the microvalve is opened. The micropump(s) can also be made with microvalves in the same set of wafers to form a single component.

FIGS. 2 and 3 show a first embodiment of a display device 2 according to the invention in a watch 1. A top plate of the display device defines a top part of a watch dial. This watch 1 conventionally includes a case 11 provided with a back cover 12 in which there are arranged an electronic watch movement 16 with an associated electronic time-keeper circuit and a battery 18 that abuts on back cover 12 via a contact spring 10. Case 11 is also closed in a conventional manner by a crystal 17 covering the entire dial, and a crown button or pushbutton 19 of the case for setting the time of the watch or the date.

In this embodiment, the time or date display is shown in digital form. Each cavity 29 capable of being filled with the coloured fluid represents one of the seven segments of the four digits representing the numbers of the time or date to be displayed on display device 2. Each cavity 29 is made in a conventional manner by a through etch or by machining certain parts of an intermediate plate 6, for example made of glass or plastic, which is subsequently enclosed between a bottom element in the form of a bottom plate 5 and a top plate 4, preferably made of glass, forming the watch dial. Of course, top plate 4 and the etched intermediate plate 6 could be formed of a single plate in which portions of cavities 29 are etched or machined in a conventional manner prior to fixing the plate to the bottom element to close the cavities.

Each cavity is thus only connected by a corresponding coloured fluid feed channel 28 made in bottom element 5. Each channel 28 is connected to an outlet of a specific microvalve 27, which is controlled by electric signals provided by control means that are not shown, but clocked by a time base of the time-keeper circuit of watch movement 16. A common outlet pipe 25 connects each inlet of the microvalves in order to be connected to an outlet of micropump 23, whose inlet is connected by an inlet pipe 26 to a coloured fluid tank 24. Micropump 23 is also controlled by electric signals provided by the control means clocked by the time base. All of the components described above, which are illustrated symbolically in FIG. 2, can be made in the same element or bottom substrate except for coloured fluid tank 24.

The thickness of the intermediate plate may be comprised between 100 or 300 µm, for example of the order of 150 µm, which defines the height of each cavity. The width of each feed channel 28 may be comprised between 10 and 50 µm, for example of the order of 30 µm so as to allow a non-viscous coloured fluid to pass. Bottom element 5 may be made with a thickness comprised between 0.5 and 1.5 mm.

As shown in FIGS. 2 and 3, intermediate plate 6 around the cavities has the same colour, for example black, as the coloured fluid for a negative contrast display, whereas the top glass or plastic plate 4 is entirely transparent. So that the display device does not in this case display any information, each cavity 29 must be filled with the coloured fluid. In order to display time or date information, a certain number of cavities are emptied of the coloured fluid. In this manner, each segment of the digits of the figures to be displayed appears in the field of view of the display device in another colour, for example of the same white or silver colour as bottom plate 5.

Of course, one could envisage using a positive contrast data display, which is not shown in FIG. 3, in display device 2. In such case, intermediate plate 6, and top plate 4 are preferably transparent, whereas the top surface of bottom element 5 has a white or silver colour in the field of view of display device 2. Each cavity is emptied of the coloured fluid in the rest state when the display device is not displaying any information. In order to display information, certain cavities 29 can however be filled with said coloured fluid by controlling the micropump and respective microvalves using electric signals provided by the control means.

Figure 4:
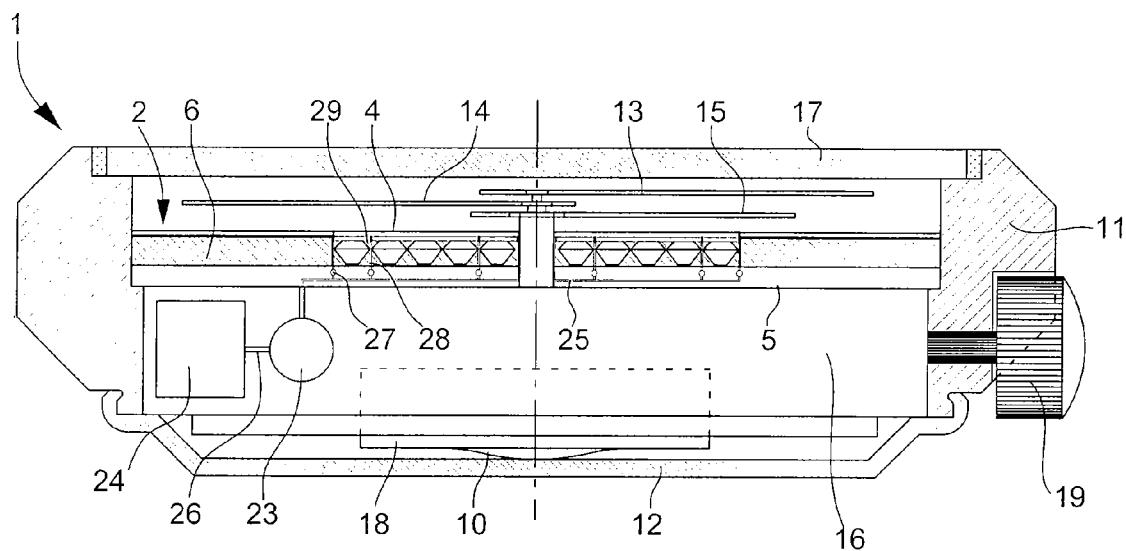
FIGS. 4 and 5 show a diametral cross-section and a top view of a second embodiment of a display device according to the invention including an intermediate plate or a transparent or semi-transparent support with precious stones fitted to a watch with a hand time display.
Figure 5:
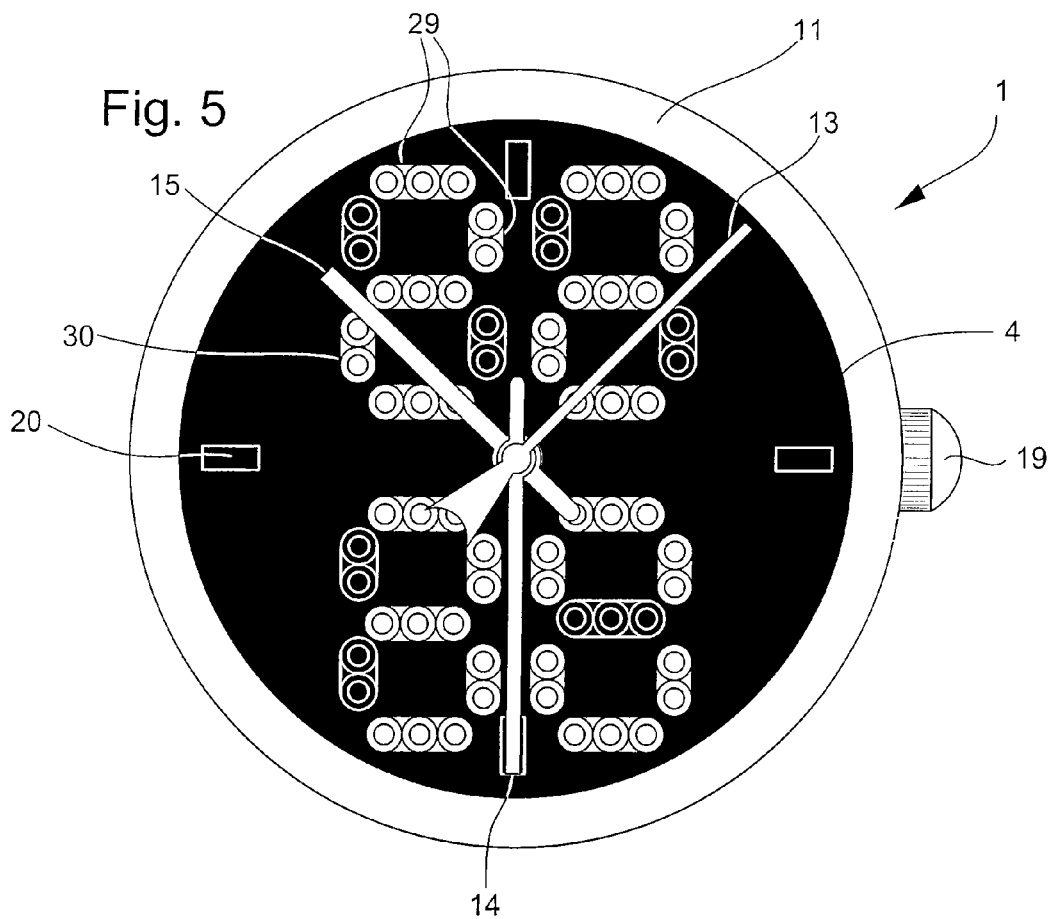

FIGS. 4 and 5 show a second embodiment of a display device 2 according to the invention fitted to a watch 1. As previously, a transparent top plate 4, for example made of glass, of display device 2 defines a top part of a watch dial. It should be noted that all the components of watch 1, which includes display device 2 according to the invention, described hereafter bear the same reference signs as those shown in FIGS. 2 and 3. For the sake of simplification, the description of each of these components will not be repeated for FIGS. 4 and 5.

The watch in this second embodiment is capable of providing a time indication using a second hand 13, a minute hand 14 and an hour hand 15. These hands are driven by a drive device (not shown). The hands move above a dial formed in part by top plate 4 of display device 2, which carries hour symbols 20 that are visible in FIG. 5. In order to do this, the arbour of the hands passes through an aperture 9 made at the centre of display device 2 so as to be driven by the drive device of watch movement 16.

The intermediate plate 6, preferably made of transparent or semi-transparent plastic, of display device 2 includes several transparent or semi-transparent stones 30 held in the material of the plate. These stones, which are preferably precious stones, are arranged under each segment of the digits formed by cavities 29. The dimension of the segments and the precious stones is selected such that at least one precious stone, and preferably at least two precious stones, are seen per transparent segment, i.e. when the corresponding cavity is emptied of the coloured fluid. In this case, it is possible to observe 2 or 3 or more precious stones in their entirety through certain transparent segments as shown by the time indication 22h30 in FIG. 5.

The suitable width of each precious stone can be chosen to be less than 1 mm, for example of the order of 0.8 mm (0.01 carat) as a function of the width selected for one digit segment. The space separating each precious stone is less than the width of the stones, particularly less than 0.5 mm, for example 0.15 mm. Of course, one could envisage providing intermediate plate 6 with precious stones larger than 1 mm, for example of the order of 1.5 mm or larger.

Several sorts of stones of different colour could be integrated in intermediate plate 6. Precious stones 30 may be rubies, sapphires, emeralds, moonstones, diamonds or other precious stones. Each stone can be cut into two substantially truncated parts from the widest intermediate zone, or have several cut facets. The dimension of the stones arranged in the intermediate plate may be different. Stones of different colour or shape can be selected for each digit of data to be displayed by display device 2. The cut of the stones can be selected from among types such as brilliant, baguette or other multi faceted types in order to give the visible stones a luminous brilliance.

Cavities 29 forming each digit segment are etched into the intermediate plastic plate to be flush with the top facet of each precious stone 30. A transparent glass or plastic top plate 4 is fixed to the etched or machined intermediate plate in order to close each cavity. Each coloured fluid feed channel 28 is made through the intermediate plate in order to connect each cavity 29 to a respective microvalve 27. In the case of a negative contrast display as shown in FIG. 5, intermediate plate 6 can be tinted with the same colour, for example black, as the coloured fluid around cavities 29.

One could envisage one or several stones being arranged inside each cavity 29, rather than integrated in the material of intermediate plate 6. In such case, the coloured fluid covers each precious stone if the cavity is filled with said fluid.

Owing to precious stones 30 arranged under the cavities relative to the field of view of the display device, an improvement in the view of the displayed data is obtained by refraction or reflection of daylight through said visible stones. In order to do this, the refractive index of the intermediate plate material must be different to that of the precious stones. Colour effects can also appear by diffraction of daylight through the visible precious stones, which can improve the information display while providing the watch with an aesthetic effect.

Figure 6:
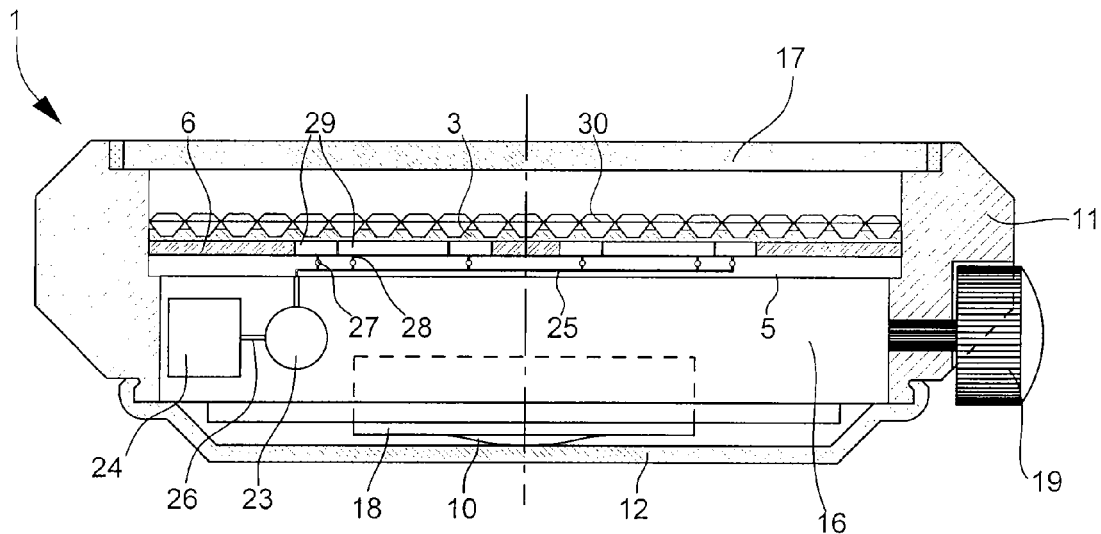
FIGS. 6 and 7 show a diametral cross-section and a top view of a third embodiment of a display device according to the invention fitted with a transparent or semi-transparent support with precious stones fitted to a watch with a digital time display.
Figure 7:
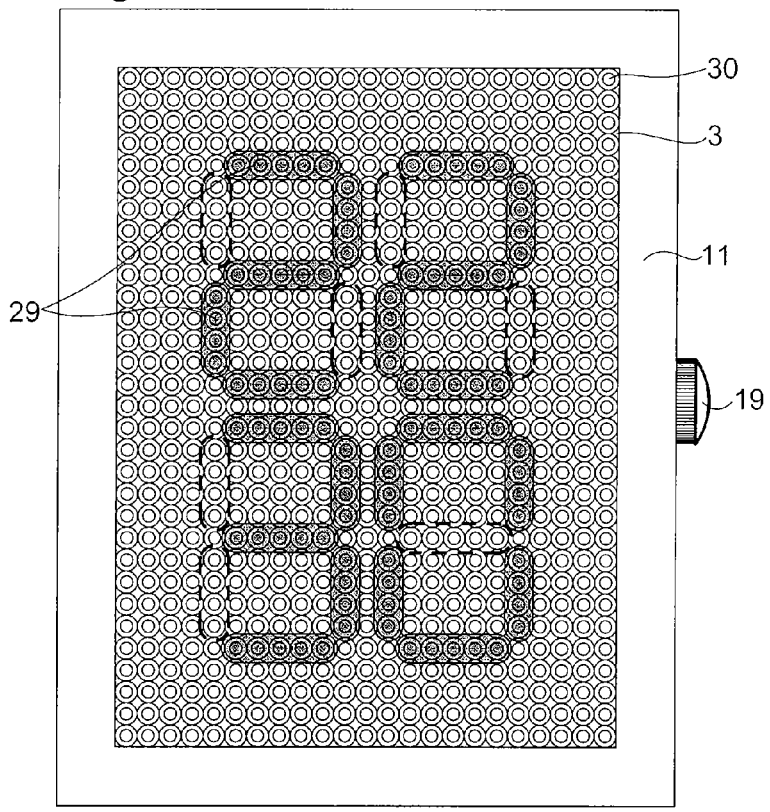

FIGS. 6 and 7 show a third embodiment of a display device 2 according to the invention fitted to a watch 1 with a digital time display. The watchcase 11 is of rectangular shape seen from above. It should be noted that all of the components of watch 1, which includes the display device 2 according to the invention, described hereafter bear the same reference signs as those shown in FIGS. 2 to 5. For the sake of simplification, the description of each of these components will not be repeated for FIGS. 6 and 7.

The essential difference of this third embodiment relative to the first embodiment is that instead of the top plate for closing each cavity 29 obtained by etching or machining intermediate plate 6, a precious stone support 3 is used. This transparent or semi-transparent support 3 forms a grid holding several transparent or semi-transparent precious stones 30 of identical or different colour. In this case, the precious stones close to each other can cover the entirety of the portion of the support that is directly visible in the field of view of display device 2.

The intermediate plate is preferably transparent so as to allow the display of information by positive contrast, by filling the selected cavities with the coloured fluid. A backlighting device could also be provided in this embodiment, preferably formed by a light emitting sheet placed on the top surface of bottom element 5 in the form of a plate. This backlighting device allows the display device information to be seen in the dark while passing through the visible precious stones 30 of support 3.

One could also envisage using a frontal backlighting device placed above the top plate and/or support 3 for transparent or semi-transparent precious stones 30. This frontal backlighting device may be formed for example of a conventional light emitting diode (LED) or organic LED (OLED) arranged in proximity to watchcase 11.

From the description that has just been given multiple variants of the display device can be devised by those skilled in the art without departing from the scope of the invention defined by the claims. The plates, forming the main part of the display device, can be bent in the form of a cylinder portion in order to be fitted to a watch whose case is also curved. The information displayed by the display assembly may be of the alphanumerical type, or an image or a design. The coloured fluid tank may be connected via an isolated passage through the watchcase for filling it with coloured fluid or for changing the type of coloured fluid, for example a different colour. Two tanks can be provided for two coloured fluids of different colours, and two micropumps each connected to a respective tank for filling each cavity with one or other of the coloured fluids via a first channel connected to one micropump or via a second channel connected to the other micropump. A component comprising two micropumps operating inversely could be provided so as to define a two-directional type micropump component.

The invention claimed is:

1. A display device for a portable instrument, the device including:
   at least a first transparent or semi-transparent plate arranged on a bottom element; and
   several cavities being formed at least in part in the first plate in the field of view of the device to display information through the plate, each cavity being connected by a respective channel through the bottom element to a tank of coloured fluid via feed means for filling or emptying each closed cavity of coloured fluid for the display of information, the feed means including at least one micropump connected to the coloured fluid tank, wherein the coloured fluid feed means include, for feeding each cavity with coloured fluid, a microvalve directly connected to the respective channel of the closed cavity to be filled with or emptied of coloured fluid, each microvalve being connected by a common outlet pipe to a micropump, which is directly connected by an inlet pipe to the tank of coloured fluid.

2. The display device according to claim 1, wherein the respective channels of the closed cavities pass through the bottom element, which is opaque, to be connected to the coloured fluid tank via the coloured fluid feed means.

3. The display device according to claim 1, wherein the micropump and the microvalves are controlled by electric signals supplied by control means, the microvalves being closed in a rest position without any control signals being supplied by the control means to keep the coloured fluid in the selected cavities as a function of the information to be presented.

4. The display device according to claim 3, wherein the portable instrument is a watch, the watch including an electronic watch movement with a time-keeper circuit, wherein the microvalves arranged in the bottom element and the micropump are activated by electric signals supplied by the control means, which are clocked by a time base of the time-keeper circuit so as to select certain closed cavities to be filled with or emptied of coloured fluid in order to display a time or date, said closed cavities being configured in digits each formed of display segments.

5. The display device according to claim 1, wherein the first plate is formed of a top plate fixed to an intermediate plate, which is arranged on the bottom element, each closed cavity being formed at least in part in the intermediate plate.

6. The display device according to claim 5, wherein each cavity formed in the intermediate plate from a bottom surface of the top plate is closed by the top surface of the bottom element.

7. The display device according to claim 5, wherein the display device further includes a set of transparent or semi-transparent stones that are held in the material of the intermediate plate to combine the information displayed with the refraction of light through the visible stones or the reflection onto or in said stones, or that are held in the material of the intermediate plate to combine the information displayed with the refraction of light through the visible stones and the reflection onto or in said stones, and wherein each closed cavity is formed in the intermediate plate between a top facet of each stone and a bottom surface of the top plate, the coloured fluid feed channel of each cavity passing through the intermediate plate and passing through the bottom element to be connected via the feed means to the coloured fluid tank.

8. The display device according to claim 7, wherein the stones are precious stones that are arranged in the material of the intermediate plate in the form of digits opposite the cavities configured in digits, and wherein the shape and dimension of each segment formed by each closed cavity are selected so that the entirety or a part of at least two stones per cavity not filled with coloured fluid is perceived.

9. The display device according to claim 1, wherein the first plate is formed of a transparent or semi-transparent support secured to an intermediate plate that is arranged on the bottom element, each closed cavity being formed at least in part in the intermediate plate, and wherein the support forms a grid holding several precious transparent or semi-transparent stones close to each other to cover the portion of the support that is directly visible in the field of view of the display device.

10. A watch including in a case closed by a crystal a display device according to claim 1, wherein the coloured fluid feed means of the display device include at least one micropump connected to a tank of coloured fluid and several microvalves connected via a common outlet pipe to the micropump, each microvalve being connected to a respective cavity via a channel through the bottom element, and wherein the micropump and the microvalves are controlled by electric signals supplied by control means clocked by a time base of the watch movement so that certain selected cavities are filled with or emptied of the coloured fluid for displaying information.

11. The watch according to claim 10, wherein one part of the display device forms the watch dial, and wherein time indicating hands, which are driven by a drive device of a watch movement, pass through the bottom element and the first transparent or semi-transparent plate to indicate the time.

12. The watch according to claim 10, wherein said closed cavities are configured in digits each formed of display segments, and wherein the micropump and the microvalves are controlled by electric signals supplied by control means, the microvalves being closed in a rest position without any control signals being supplied by the control means to hold the coloured fluid in the selected cavities as a function of the information to be presented.

13. The watch according to claim 10, wherein the coloured fluid tank is connected by an isolated passage through the watchcase so as to be filled with coloured fluid or to allow the type of coloured fluid to be changed.

14. The watch according to claim 10, wherein the information displayed is a time or a date.

15. The display device for a portable instrument according to claim 1, wherein the portable instrument is a watch.

* * * * *